United States Patent
Schmidt

(10) Patent No.: US 11,148,701 B2
(45) Date of Patent: Oct. 19, 2021

(54) STEERING WHEEL OF A MOTOR VEHICLE

(71) Applicant: Brose Fahrzeugteile SE & Co. Kommanditgesellschaft, Coburg, Coburg (DE)

(72) Inventor: Denis Schmidt, Berlin (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 16/961,162

(22) PCT Filed: Jan. 7, 2019

(86) PCT No.: PCT/EP2019/050257
§ 371 (c)(1),
(2) Date: Nov. 16, 2020

(87) PCT Pub. No.: WO2019/137875
PCT Pub. Date: Jul. 18, 2019

(65) Prior Publication Data
US 2021/0070348 A1    Mar. 11, 2021

(30) Foreign Application Priority Data
Jan. 11, 2018   (DE) .................... 10 2018 200 436.6

(51) Int. Cl.
*B62D 1/08*   (2006.01)
*B62D 1/06*   (2006.01)
*B62D 1/10*   (2006.01)

(52) U.S. Cl.
CPC ............... *B62D 1/08* (2013.01); *B62D 1/06* (2013.01); *B62D 1/10* (2013.01)

(58) Field of Classification Search
CPC ............ B62D 1/10; B62D 1/08; B62D 1/06
See application file for complete search history.

(56) References Cited

U.S. PATENT DOCUMENTS 7,004,048 B2 *   2/2006   Kobayashi et al.
8,002,075 B2 *   8/2011   Markfort

FOREIGN PATENT DOCUMENTS

| DE | 10247370 B4 * | 5/2005 | ............ B62D 1/10 |
| DE | 102008045912 A1 | 5/2009 | |
| DE | 102008045918 A1 * | 5/2009 | ............ B62D 1/06 |
| DE | 102008045921 A1 * | 5/2009 | ............ B62D 1/06 |
| DE | 102008045921 A1 | 5/2009 | |
| DE | 102010055589 A1 | 6/2012 | |
| DE | 102016002204 A1 | 8/2017 | |
| WO | 03024785 A1 | 3/2003 | |

* cited by examiner

*Primary Examiner* — Vicky A Johnson
(74) *Attorney, Agent, or Firm* — Brooks Kushman, P.C.

(57) ABSTRACT

A steering wheel of a motor vehicle, with a hub arranged parallel to a longitudinal axis, and with a segment of a steering wheel rim comprising a rim portion. The rim portion is attached to the first spoke, which is attached to the hub, and the rim portion is attached to a second spoke, which is attached to the hub in a manner rotatable about a pivot axis running parallel to the longitudinal axis and offset in relation thereto. A steering device of a motor vehicle comprising a steering wheel.

20 Claims, 6 Drawing Sheets

STEERING WHEEL OF A MOTOR VEHICLE

CROSS-REFERENCE TO RELATED APPLICATIONS

This application is the U.S. National Phase of PCT/EP2019/050257 filed Jan. 7, 2019, which claims priority to DE 10 2018 200 436.6 filed Jan. 11, 2018, the disclosures of which are hereby incorporated in their entirety by reference herein.

TECHNICAL FIELD

The present disclosure relates to a steering wheel of a motor vehicle.

BACKGROUND

Motor vehicles usually have front road wheels, by means of which a desired direction of the motor vehicle is set. To this end, the front road wheels are in most instances coupled by means of a steering link to which a steering wheel is attached. The desired direction is set by the driver of the motor vehicle by means of the steering wheel. The steering wheel is rotated to this end such that the front road wheels point in the desired direction. The steering wheel per se is usually positioned so as to be level with the chest of the driver such that he/she can grip the steering wheel in a comparatively easy manner. The freedom of movement of the driver is restricted by virtue of the position such that he/she cannot turn sideways in his/her seat, or can do so only with comparatively great difficulty. Entering and alighting the motor vehicle is also impeded. In comparatively tight passenger cabins such as in racing vehicles, for example, it is therefore known for the steering wheel to be designed to be removable such that the steering wheel can be disassembled prior to entering. The steering wheel is assembled again once the driver has positioned himself/herself in the vehicle seat so that the driver is able to steer the vehicle. Alighting the motor vehicle in the case of an assembled steering wheel herein is impossible, or is possible only with comparatively great difficulty.

Motor vehicles are becoming increasingly automated so that the motor vehicles can be moved autonomously. Various levels of automation are distinguished herein. As from so-called level 3, this corresponding to a high level of automation, it is not necessary for the driver to continuously monitor the individual systems which serve for steering the motor vehicle. Consequently, the driver can attend to other matters, and a steering intervention is however also possible or to some extent necessary. When the motor vehicle is thus moving in level 3 mode, it is not necessary for the driver to operate the steering wheel. The driver therefore does not require the steering wheel, at least not during specific temporal intervals. However, driver space and thus comfort are compromised since it is mandatory for the steering wheel to nevertheless be present.

SUMMARY

The present disclosure aims to accomplish a number of objectives, such as providing a suitable steering wheel and suitable steering device increase space for a user in the vehicle and/or enhance comfort of the vehicle.

The steering wheel is a component part of a motor vehicle such as a passenger motor vehicle or a commercial motor vehicle. A direction, in which the motor vehicle travels when in operation, is set by means of the steering wheel. The steering wheel is suitable to this end. In other words, the steering wheel serves for steering the movement of the motor vehicle and for selecting and/or setting a direction of travel.

According to one embodiment, a steering wheel provided with a hub disposed parallel to a longitudinal axis, is provided. For example, the hub is suitable for being mounted so as to be rotatable about the longitudinal axis. The hub may be to be substantially cylindrical, and the cylinder axis may be parallel to the longitudinal axis and coincides with the latter, for example. The hub may be concentric with the longitudinal axis. The steering wheel may include a steering wheel rim which serves for engaging a user of the motor vehicle, such as the driver. The steering wheel rim may include a segment having a rim portion, a first spoke, and a second spoke. The second spoke is disposed, for example, so as to be in one plane with the first spoke. The rim portion herein is in particular suitable, expediently provided and specified, for being gripped by the user of the motor vehicle. The rim portion is suitably designed so as to be rigid and has a foam padding, for example, which is trimmed with a planar structure, for example a plastics material, leather, or a fabric. In other words, the padding is provided with a covering.

The rim portion may be attached to a first spoke and may be configured to articulate so as to be rotatable on said first spoke. The rim portion is thus rotatable in relation to the first spoke. The rotation axis herein may be parallel to the longitudinal axis. The rim portion is furthermore attached to the second spoke, such as articulated so as to be rotatable on the second spoke. The rotation axis, in relation to which the rim portion is articulated so as to be rotatable to the second spoke, may be parallel to the rotation axis, about which the rim portion is articulated so as to be rotatable in relation to the first spoke. The articulation of the rim portion on the first spoke and/or the second spoke such as takes place by means of a rotary joint, for example a bearing. The connection between the rim portion and the first spoke and the second spoke, respectively, in the manner of a pin joint. The second spoke is attached so as to be rotatable about a pivot axis on the hub. The pivot axis is parallel to the longitudinal axis and is offset in relation to the latter. In other words, the pivot axis has a spacing from the longitudinal axis and does not intersect the latter. The spacing may be between 1 cm and 20 cm, between 2 cm and 10 cm, and substantially equal to 5 cm, and there may be a deviation of 5 cm, 2 cm, or 0 cm. The pivot axis may be parallel to the rotation axis in terms of which the rim portion is rotatable in relation to the first spoke and/or the second spoke.

By virtue of the rotatable second spoke, it is possible for the spacing between the rim portion attached to the second spoke and the hub to be varied. It is thus possible for the extent of the steering wheel rim perpendicular to the longitudinal axis to be varied. Consequently, it is possible for additional space to be provided to a driver of the motor vehicle. The second spoke during manual steering of the motor vehicle is suitably disposed in such a manner that the rim portion has the maximum spacing from the hub. Alternatively thereto, the second spoke is moved to a specific position at which any engagement of the user on the rim portion is simplified or is comparatively comfortable. Should the driver not wish to perform manual steering of the motor vehicle, in particular during autonomous travel of the motor vehicle, for example when entering a parking bay in an automated manner, or when the motor vehicle is parked, the spacing of the rim portion from the hub may be reduced and set to a minimum value, for example. At least the spacing of the portion of the rim portion that is attached to the second spoke is preferably reduced. The second spoke herein may be guided, suitably by means of a guide. The hub may include the guide, for example a slot, the second spoke at least in part bearing within said slot. The slot, at least in portions, runs circumferentially along the hub, for example.

Summarizing, by means of pivoting the second spoke, it is possible for the rim portion to be moved to various positions in relation to the hub. A configuration, in which the manual activation of the steering wheel is simplified, is in particular achieved herein. The steering wheel rim, in a first configuration, may have a substantially consistent and/or maximum spacing from the hub. It is furthermore possible for the rim portion at least in portions to be moved close to the hub, for example to a minimum spacing. A second configuration, in which a manual activation of the steering wheel is substantially impossible or at least undesirable, is achieved herein.

The first spoke at the end side may be attached to/articulated on the rim portion. Alternatively or additionally thereto, the second spoke at the end side is attached to/articulated on the rim portion. The spokes thus do not project beyond the rim portion, and any risk of injury to the user is minimized. The rim portion herein is also located at least at the same distance from the hub as the spokes, this simplifying any operation. For example, the first spoke at the end side is attached to the hub. As an example, the second spoke at the end side is attached to the hub. The pivot axis preferably runs through an end or an end region of the second spoke and is spaced apart from an end of the second spoke by at most 2 cm, 1 cm, or 0.5 cm, for example.

The first spoke is likewise attached to the hub so as to be rotatable about a second pivot axis, for example. The second pivot axis herein is likewise offset in relation to the longitudinal axis. The second pivot axis is identical to the pivot axis or is offset in relation to the latter, for example. It is thus possible for the spacing of the rim portion to be varied across a comparatively large range. The spacing of the rim portion from the hub herein, in particular in a direction perpendicular to the longitudinal axis, is suitably substantially identical across the entire rim portion, and there is a deviation of 10%, 5%, 2%, or 0%, for example. However, the first spoke is particularly preferably rigidly attached to the hub and molded to the latter, for example. A comparatively simple production of the first spoke and the attachment to the hub is thus enabled. In other words, the first spoke and the hub are monolithic. The pivot axis herein may be designed so as to be displaceable, and the second spoke is thus also attached to the hub so as to be displaceable in a translatory manner. In other words, a displacement of the pivot axis also takes place in a rotation of the second spoke about the pivot axis, and the spacing from the pivot axis is varied or maintained so as to be consistent, for example. A comparatively robust steering wheel is thus achieved, and the region of the rim portion which is attached to the second spoke is moved toward or away from the hub when the second spoke is pivoted. The region which is attached to the first spoke herein has a substantially consistent spacing from the hub.

The first spoke may be disposed perpendicular to the longitudinal axis. In other words, the first spoke runs so as to be substantially perpendicular to the longitudinal axis, and the first spoke is designed so as to be substantially cylindrical, such as cuboid, for example. For example, the direction of main extent of the first spoke is perpendicular to the longitudinal axis. The rotation axis, about which the rim portion is rotatably articulated on the first spoke, may be substantially perpendicular to the direction of main extent of the first spoke and/or of the rim portion. The first spoke suitably runs so as to be substantially radial in relation to the longitudinal axis. In other words, the first spoke runs along a straight line which intersects the longitudinal axis and is perpendicular to the latter. The first spoke is in particular disposed so as to be concentric with the straight line. A requirement in terms of space and material is further minimized in this way.

The second spoke expediently has a first terminal detent. As an example, the second spoke additionally comprises a second terminal detent. The second spoke herein is rotatable about the pivot axis between the two terminal detents. In other words, the rotation of the second spoke about the pivot axis is delimited by means of the terminal detents. Should the second spoke be located at the first terminal detent, the second spoke may be disposed so as to be perpendicular to the longitudinal axis. The second spoke is in particular designed so as to be cylindrical, suitably cuboid, and is thus disposed along a straight line which may intersect the longitudinal axis at the first terminal detent. The second spoke thus runs in particular in the radial direction in relation to the longitudinal axis. For example, the pivot axis is substantially perpendicular to a main extent in the direction of the second spoke. The rotation axis, about which the rim portion is rotatably articulated on the second spoke, is substantially perpendicular to a main extent in the direction of the second spoke and/or of the rim portion. The steering wheel, when the second spoke is located at the first terminal detent, thus has a comparatively large extent perpendicular to the longitudinal axis, this simplifying an operation of the steering wheel by the user.

When the second spoke is located at the first terminal detent, the first configuration may be present. When the spoke bears on the second terminal detent, the second configuration may be present. In particular, the two terminal detents differ from one another by an angle between 45° and 10°, 30° and 20°, and for example substantially 25°, and there is in particular a deviation of 5°, 2°, or 0°.

The steering wheel particularly may include a locking device for locking the second spoke. The locking device is suitable, in particular provided and specified, to this end. For example, the locking device has an actuator, for example an electromechanical actuator. A rotation of the second spoke about the pivot axis is prevented when the actuator is activated. Moving the pivot axis out of position herein is in particular also prevented. The locking mechanism herein is a latching mechanism, for example. In other words, the locking device is a latching device. In particular, the locking is established in a substantially automatic manner for reasons of production, and is cancelled again only by means of activating the respective actuator. Any inadvertent rotation of the second spoke, and thus moving the rim portion out of position in relation to the hub, is thus avoided, this increasing safety. A warning signal is suitably emitted when the locking mechanism is released. For example, the steering wheel comprises a signal device of this type, or is suitable, in particular provided and specified, for being coupled in terms of signal transmission to a signal device of this type. An acoustic, haptic, or visual signal is emitted herein by means of the signal device, for example.

Locking herein expediently takes place at the terminal positions of the second spoke, for example when the latter thus bears on the first terminal detent. The locking however takes place at least when the second spoke is located at a terminal position in the direction of pivoting. The second spoke is suitably latched in the first configuration or the second configuration, and in the first configuration as well as the second configuration.

Alternatively thereto, or in a particularly preferable combination therewith, the steering wheel has an electromotive adjustment device. The second spoke is driven by means of the electromotive adjustment device. In other words, the rotation of the second spoke, when in operation, takes place by means of the electromotive adjustment device. The electromotive adjustment device expediently has an electric motor, for example a brushless DC motor (BLDC). For example, a gear mechanism, in particular a worm gear mechanism or a spindle, which is operatively connected to the second spoke, is driven by means of the electric motor. The second spoke is thus adjusted and thus rotated about the pivot axis by means of the electromotive adjustment device. The pivot axis herein is likewise displaced in relation to the longitudinal axis, for example.

Alternatively, the first spoke, to the extent that the latter is likewise rotatably attached to the hub, is driven by the electromotive adjustment device or a further electromotive adjustment device, for example. The level of comfort offered to a user of the motor vehicle is increased by virtue of the electromotive adjustment device. The electromotive adjustment device is in particular activated when the motor vehicle is parked. The rim portion is in particular moved to the hub herein, such that a space requirement of the steering wheel is minimized, this facilitating entering and alighting. As soon as the ignition of the motor vehicle is activated, for example, the second spoke is driven by means of the electromotive adjustment devices and the rim portion is moved to the position at which engagement by the user is simplified, thus in particular moved to the second configuration.

For example, the locking device, to the extent that the latter is present and in particular to the extent that the latter comprises the electromechanical actuator, is activated by means of the electromotive adjustment device. Alternatively thereto, the locking device is provided by means of the electromotive adjustment device. For example, the respective gear mechanism of the adjustment device is designed so as to be self-locking such that moving the second spoke is possible only by means of the drive of the electric motor.

For example, the rim portion at one end thereof is attached to/articulated on one of the two spokes. The rim portion at opposite ends may be attached to/articulated on the two spokes. The spacing of the rim portion from the hub is thus determined substantially by means of the two spokes, and the rim portion does not project beyond the two spokes, in particular in a direction that is tangential in relation to the longitudinal axis. Alternatively thereto, or in combination therewith, the rim portion is designed so as to be arcuate. Any engagement of the user on the rim portion is thus simplified. Alternatively thereto, the rim portion is designed so as to be substantially rectilinear such that there is only a comparatively minor requirement in terms of material.

The steering wheel may include a further segment which thus likewise has a rim portion, a first spoke, and a second spoke, and the first spoke of the further segment is attached to the hub, and the second spoke of the further segment is attached so as to be rotatable about a pivot axis on the hub. The rim portion of the further segment is furthermore attached to/articulated on both spokes of the further segment. The rim portions of the two segments herein are preferably offset in relation to one another, such as in a direction that is tangential in relation to the longitudinal axis. The two first spokes may be mutually parallel, in particular in the first configuration. The two first spokes herein are located on the same side of the hub, for example, and the rim portions may be directed in opposite directions. In other words, the two second spokes are located on sides that are, in each case, opposite in relation to the first two spokes, such as in the tangential direction. Alternatively thereto, the two first spokes are disposed on opposite sides of the hub. For example, the two second spokes herein are located on the same side in relation to the hub, or on opposite sides of the hub. As an example, the pivot axes, about which the two spokes are rotatably mounted, are identical. For example, the second spokes are mutually parallel at least in one configuration, in particular in the first configuration. The pivot axes which are assigned to each of the two second spokes herein may be mutually offset. In one alternative design embodiment, the two first spokes are pivoted in relation to one another, in particular by an angle of 90°, for example.

The steering wheel may have a plurality of segments of this type, and the arrangement of the first spokes, for example in the first configuration, is rotationally symmetrical in relation to an angle which is equal to the fraction of 360° and the number of the first spokes. A closed contour, for example a rim or a regular polygon, may be established by means of the rim portions, such as in the first configuration. Engaging on the steering wheel is thus possible in substantially any position. Alternatively thereto, there are only a limited number of segments, for example only two of the segments, which are located on opposite sides of the hub. In particular, the segments in a straight orientation of the road wheels are disposed on opposite sides of the hub in terms of the horizontal direction, this further enhancing the level of comfort. For example, the segments are mutually offset parallel to the longitudinal axis, for example by 0.5 cm, 1 cm, or at most 5 cm. Rotation of the second spoke in relation to the respective pivot axis is thus not substantially impeded. In other words, unimpeded rotation of the second spokes in relation to the respective first spokes can take place.

The hub may include a personal protection device. The personal protection device may be a gas bag, or may include at least one gas bag. In the event of an accident, the gas bag is inflated by means of an explosive charge of the personal protection device. In other words, the personal protection device is preferably a so-called airbag/airbag system. The hub thus serves for attaching the steering wheel rim as well as for protecting the driver of the motor vehicle. The steering wheel rim serves in particular as a support for the gas bag, and an impact of the head of a driver on the steering wheel is precluded by means of the gas bag.

The rim portion in relation to the hub is preferably mounted so as to be displaceable parallel to the longitudinal axis. To the extent that a plurality of rim portions of this type are present, the latter can thus be spaced apart so as to be parallel to the longitudinal axis. In particular, the rim portions herein in the first configuration do not have any spacing parallel to the longitudinal axis. Engaging on the steering wheel rim by the driver is thus facilitated. In order to be transferred from the first configuration to the second configuration, the rim portions are expediently spaced apart parallel to the longitudinal axis. Pivoting about the respective pivot axis is thus possible in a substantially unimpeded manner.

The steering device is a component part of a motor vehicle and serves in particular for setting a direction of movement/direction of travel of the motor vehicle. To this end, the steering device may be coupled to the road wheels of the motor vehicle. The steering device may include in particular a rack, or is provided for being coupled to a rack. The rack in the assembled state is attached to at least one of the road wheels of the motor vehicle, preferably to two of the road wheels, in particular to the front road wheels, such that a turning angle of the road wheels is varied when the rack is displaced by a specific range. The steering device may include a steering column which has in particular a pinion which is operatively connected to the respective rack. The steering wheel, at least in portions, is mounted so as to be rotatable about a longitudinal axis, for example. Power steering, in particular a so-called servo steering unit, engages on the steering column, to the extent that the steering device may include a servo steering of this type. Alternatively, the pinion is driven by means of an electric motor, which is actuated by virtue of electric signals, for example. The electric signals herein are at least in part established by means of the steering device.

A steering wheel is mounted so as to be rotatable about the longitudinal axis by means of the steering column. In a rotation of the steering wheel about the longitudinal axis, the steering column, or at least part of the steering column, is likewise rotated about the longitudinal axis, for example. Alternatively thereto, the steering column is not rotated in the rotation of the steering wheel about the longitudinal axis. The steering wheel has a hub which is disposed so as to be parallel to the longitudinal axis and which is in particular designed so as to be cylindrical and/or concentric with the longitudinal axis. The steering wheel furthermore may include a segment of a steering wheel rim that may include a rim portion. The rim portion is attached to, preferably articulated so as to be rotatable on, a first spoke of the segment, the first spoke being attached to the hub, for example in a rotatable or preferably a rigid manner. The rim portion is attached to, in particular articulated so as to be rotatable on, a second spoke of the segment, the second spoke being attached so as to be rotatable about a pivot axis on the hub that runs parallel to the longitudinal axis and is offset in relation to the latter. The pivot axis is thus offset in relation to the longitudinal axis and consequently has a spacing of, for example, 2 cm, 5 cm, 10 cm, or more, from the longitudinal axis. The turning angle of the road wheels of the motor vehicle when in operation is set by means of the rotation of the steering wheel about the longitudinal axis. The hub is in particular, preferably rigidly, attached to the steering column.

The steering wheel is preferably displaceable parallel to the longitudinal axis. The steering wheel is in particular mounted so as to be displaceable, preferably on the steering column. Alternatively, the steering column per se, at least in portions, is displaceable, in particular in a telescopic manner, parallel to the longitudinal axis, such that the steering wheel is moved parallel to the longitudinal axis in a movement of the steering column parallel to the longitudinal axis, for example in the case of a longitudinal variation of the steering column. Additional space for the user of the motor vehicle, in particular the driver, is achieved in this way, this further increasing the level of comfort. The displacement of the steering wheel parallel to the longitudinal axis suitably takes place by means of a thrust chain and/or by means of an electromotive adjustment drive.

The refinements and advantages mentioned in the context of the steering wheel can also be transferred in an analogous manner to the steering device, and vice versa.

BRIEF DESCRIPTION OF THE DRAWINGS

Exemplary embodiments of the invention will be explained in more detail hereunder by means of the drawings, in which.

Mutually corresponding parts are provided with the same reference signs in all figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
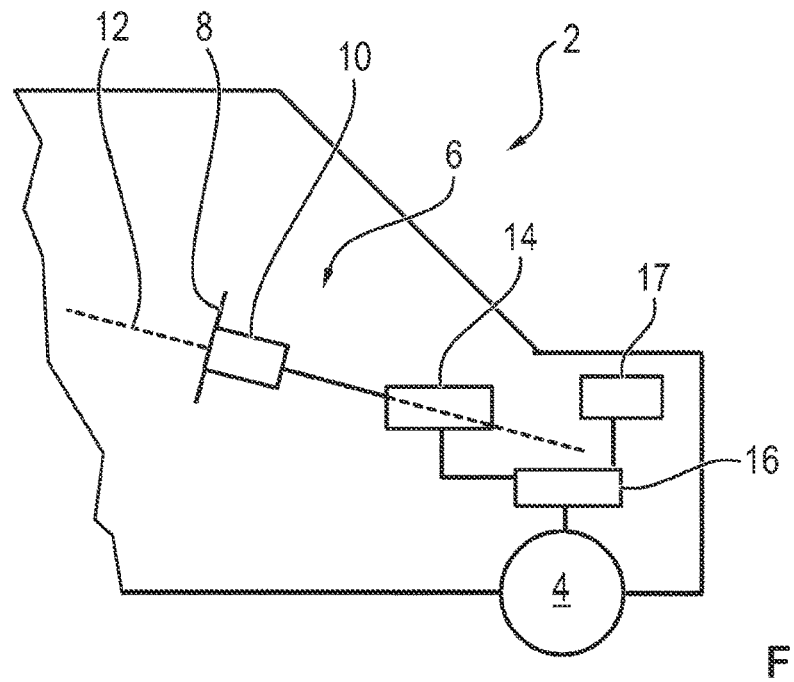
FIG. 1 schematically shows a motor vehicle having a steering device which has a steering wheel.

A motor vehicle 2 having two front road wheels 4, of which only one is shown, is illustrated in FIG. 1. The motor vehicle 2 has a steering device 6 having a steering wheel 8 and a steering column 10. The steering wheel 8 by means of the steering wheel 10 is mounted so as to be rotatable about a longitudinal axis 12. In a rotation of the steering wheel rim 8 about the longitudinal axis 12, the steering column 10 is likewise rotated about the longitudinal axis 12, this being detected by means of the sensor unit 14. The direction of rotation and the amount of rotation are transmitted to a control unit 16. The control unit 16, by means of a rack (not illustrated in more detail), is operatively connected to the front road wheels, and a turning angle of the front road wheels 4 is set by means of moving the rack in the transverse direction, such that a direction of movement of the motor vehicle 2 is varied.

The motor vehicle 2 furthermore may include an assistance system 17 which serves for autonomous travel. Control commands, by means of which the control unit 16 is impinged such that the motor vehicle 2 is moved along a specific path independently of any current operation by the driver, are established herein by means of the assistance system 17.

Figure 2:
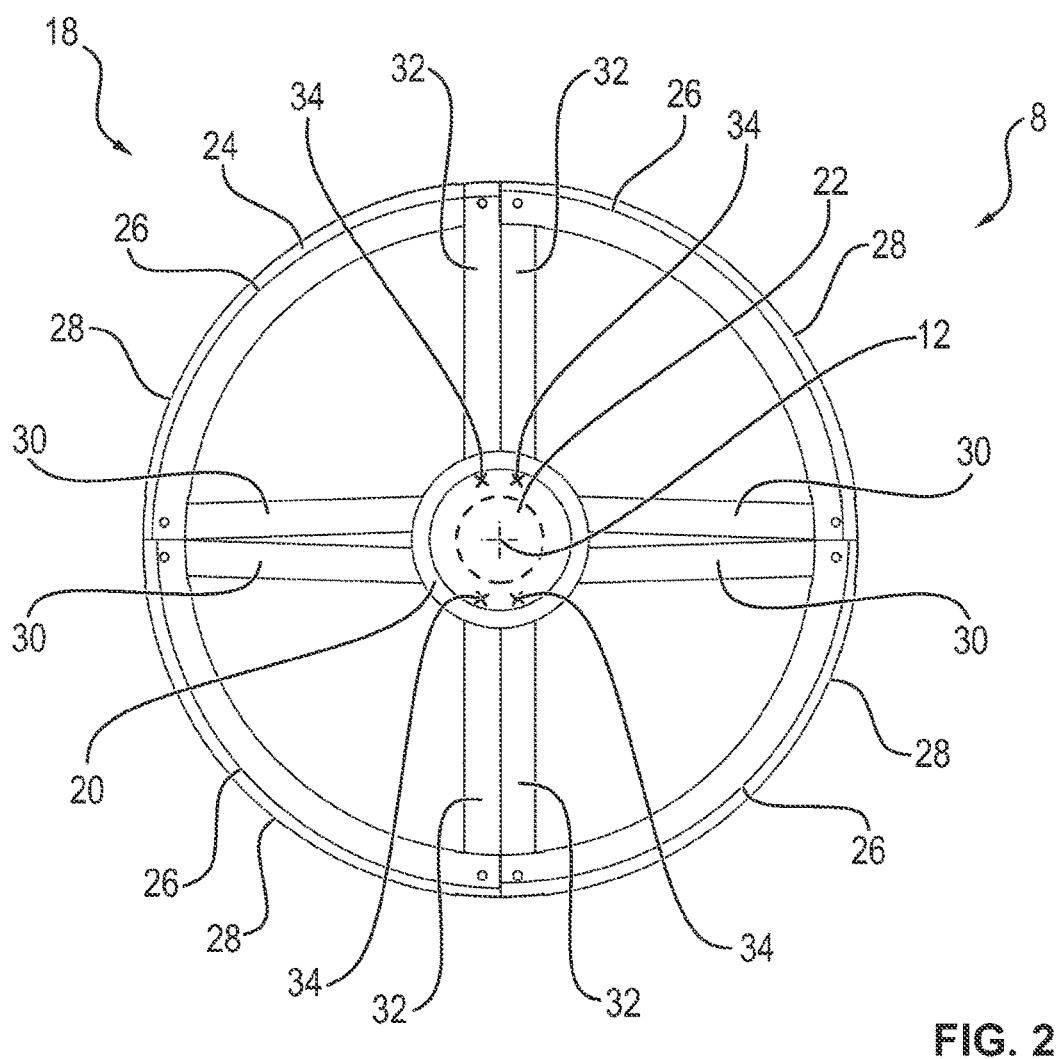
FIGS. 2-5 show the steering wheel having a first spoke and having a second spoke in a first configuration in different views.
Figure 3:
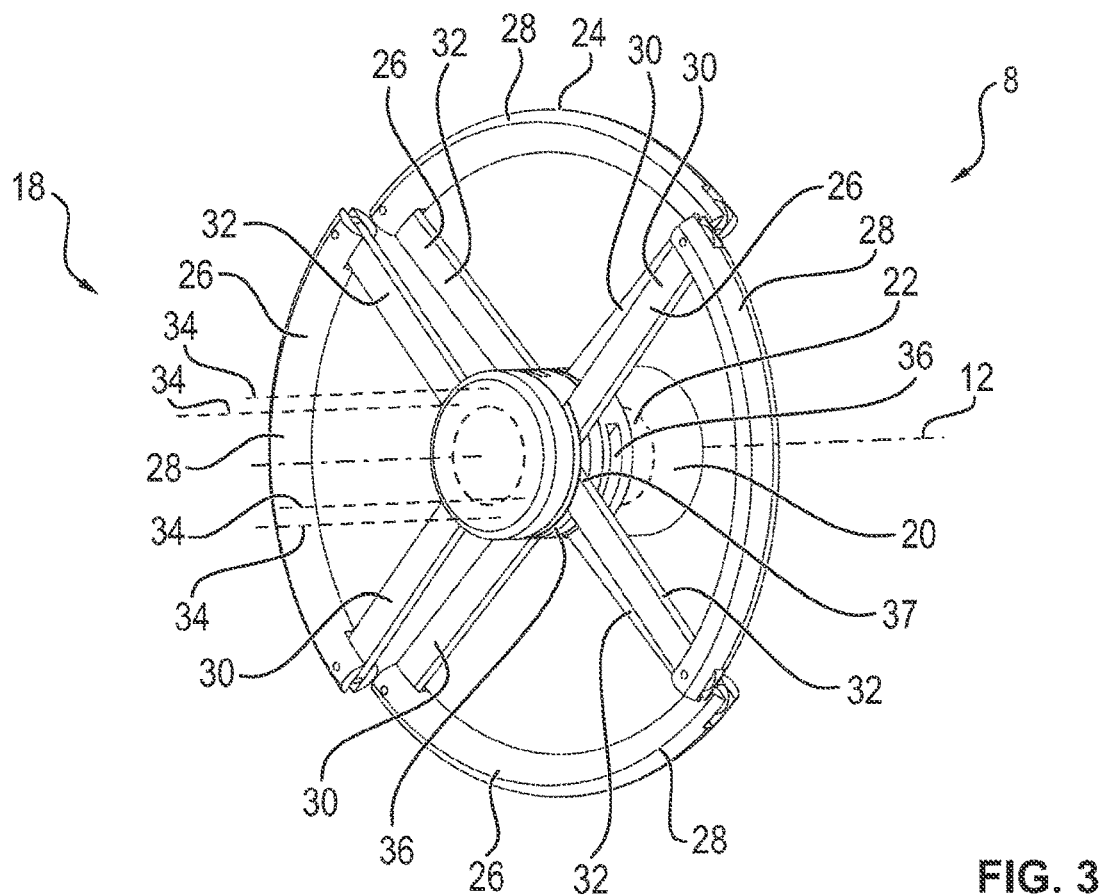
Figure 4:
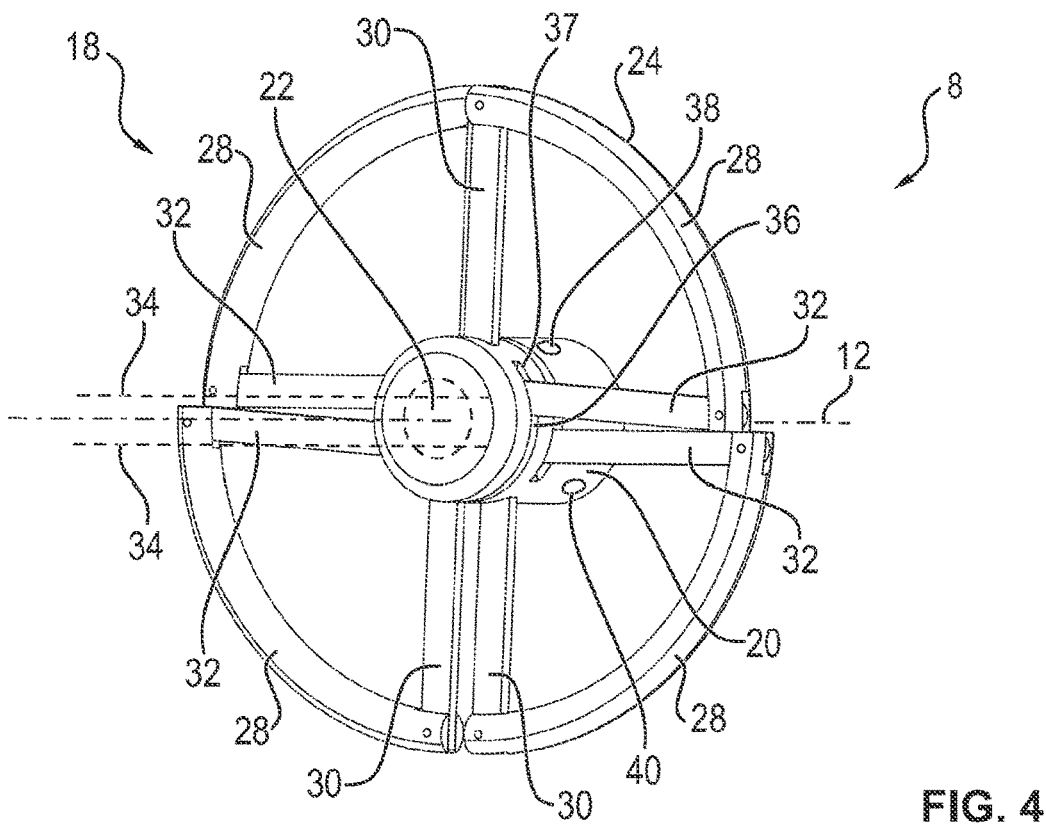
Figure 5:
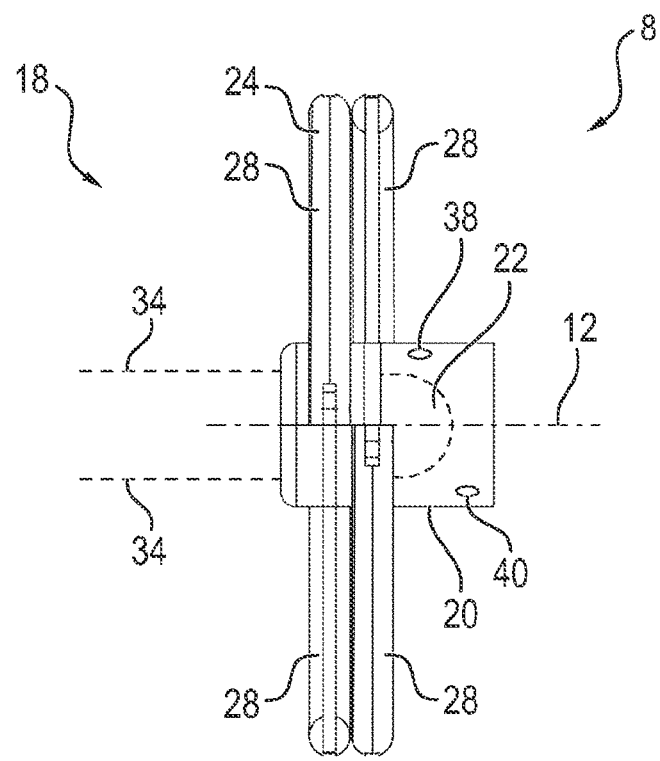

The steering wheel 8 in a first configuration 18 is shown in a plan view in FIG. 2, in a perspective view in each of FIGS. 3 and 4, and in a lateral view in FIG. 5. The steering wheel 8 has a cylindrical hub 20 which has a substantially round cross-section. The hub 20 herein is concentric with the longitudinal axis 12 and is disposed along the latter. The hub 12 has a personal protection device 22 which is spaced apart from an external side of the hub 20 and is thus located in the interior of the hub 20. The personal protection device 22 may include a gas bag which, in the event of an accident, is inflated by means of an explosive charge. In other words, the personal protection device 22 is an air bag system.

The steering wheel 8 furthermore has a steering wheel rim 24 which circumferentially surrounds the hub 20 and which has a plurality of segments 26 which are of identical configuration. Each segment 26 has a substantially arcuate rim portion 28 which has an angle of 90°. Each rim portion 28 is rigidly configured and provided with a foam padding (not shown) which is covered by means of a covering. The covering is a plastics material or a leather. The rim portions 28 in the first configuration 18 are disposed in such a manner that a round circular shape is formed in a plan view by means of the rim portions 28, as is shown in FIG. 2. Furthermore, each segment 26 has a first spoke 30, the latter being, in each case, rigidly attached to the hub 20 and disposed perpendicular to the longitudinal axis 12. The cuboid first spokes 30 herein are molded on the hub 20 and are thus integral to the latter (the first spokes 30 and the hub 20 being monolithic).

All of the first spokes 30 herein are disposed so as to be mutually parallel, and two first spokes 30 are, in each case, located on dissimilar sides of the hub 20. In other words, the hub 20 is, in each case, disposed between one pair of the first spokes 30. There is no substantial spacing in the tangential direction herein between the first spokes 30 that are disposed on the same side of the hub 20.

Moreover, each segment 26 has a cuboid second spoke 32 which is attached so as to be rotatable about a pivot axis 34 on the hub 20. The pivot axes 34 are, in each case, parallel to the longitudinal axis 12 and spaced apart from the latter. The pivot axes 34 are thus mutually parallel and do not intersect the longitudinal axis 12. The spacing of each pivot axis 34 from the longitudinal axis 12 is identical and is substantially equal to 10 cm. Furthermore, the second spokes 32, by means of, in each case, one assigned guide 36 in the form of a slot running along the circumferential side of the hub 20, are mounted so as to be movable in a translatory manner, such that the pivot axis 34 assigned in each case is also movably mounted, and the parallel orientation in terms of the longitudinal axis 12 is however maintained at all times.

The steering wheel 8 furthermore has four first terminal detents 37 of which each is, in each case, assigned to one of the second spokes 32 and by means of which a rotating movement of the respective second spoke 32 is delimited in one direction. In the first configuration 18, each second spoke 32 bears on the respective assigned first terminal detent 37 and runs perpendicular to the longitudinal axis 12. The first spoke 30 and the second spoke 32 of each segment are thus disposed in one plane perpendicular to the longitudinal axis 12, and an angle of 90° is, in each case, formed between the first spoke 30 and the second spoke 32. The second spokes 32 herein are disposed so as to be substantially mutually parallel, and two second spokes 32 are, in each case, located on dissimilar sides of the hub 20. In other words, the hub 20 is, in each case, disposed between one pair of the second spokes 32.

Each rim portion 28 is rotatably articulated so as to be rotatable on that end of the first spoke 30 of the same segment 26 that is spaced apart from the hub 20 as well as on that end of the second spoke 32 of the same segment 26 that is spaced apart from the hub 20, and the rotation axis is parallel to the longitudinal axis 12. The opposite ends of the respective rim portion 28 herein are articulated on the respective two spokes 30, 32. The articulation takes place by means of a pin joint such that it is possible for the rim portion 28 to be pivoted about the respective rotation axis in relation to the first spoke 30 and the second spoke 32 of the same segment 26. The segments 26 are mutually offset parallel to the longitudinal axis 12. The segments 26 that are opposite in relation to the hub 20 herein are, in each case, disposed in one plane, and the offset parallel to the longitudinal axis 12 is 2 cm.

The steering wheel 8 moreover has a locking device 38, by means of which the two spokes 32 are locked. Locking of all spokes 32 herein takes place by the locking device 38. Alternatively, each of the second spokes 32 is assigned one locking device 38. The second spokes 32, by means of the locking device 38, are locked in the terminal position, thus at the first terminal detent 37. The locking device 38 is a latching device. In other words, the second spokes 32 are latched at the first terminal detent 37. The second spokes 32 are thus latched at the first configuration 18 and a movement of the second spokes 32, thus a rotation in relation to the respective pivot axis 34, or a movement of the pivot axis 34, is not possible. The latching action herein is established in a self-acting mechanical manner when the second spoke 32 is located at the first terminal detent 37. The latching action, when in operation, is released by means of activating an electromechanical actuator of the locking device 38, such that pivoting is enabled.

Moreover, the steering wheel 8 has an electromotive adjustment device 40 which has a brushless DC motor (BLDC). A worm gear mechanism which is operatively connected to the second spokes 32 is driven by means of the electric motor. The second spokes 32 are thus driven by means of the electromotive adjustment device 40, and a rotation of the second spokes 32 about the respective pivot axis 34 takes place by operating the electric motor of the electromotive adjustment device 40. Furthermore, the locking device 38 is activated by means of the electromotive adjustment device 40. Prior to driving the second spokes 32 herein, the locking mechanism is first released and the latter is re-established once driving has terminated.

Figure 6:
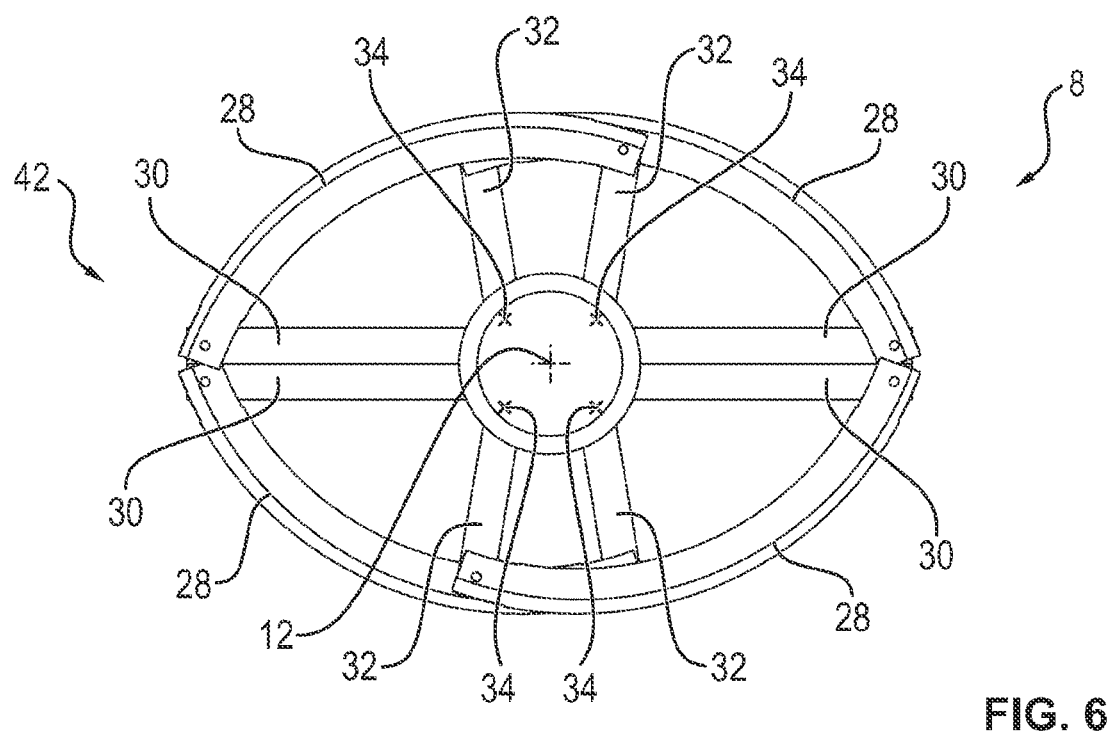
FIGS. 6, 7 show the steering wheel in a second configuration in different views.
Figure 7:
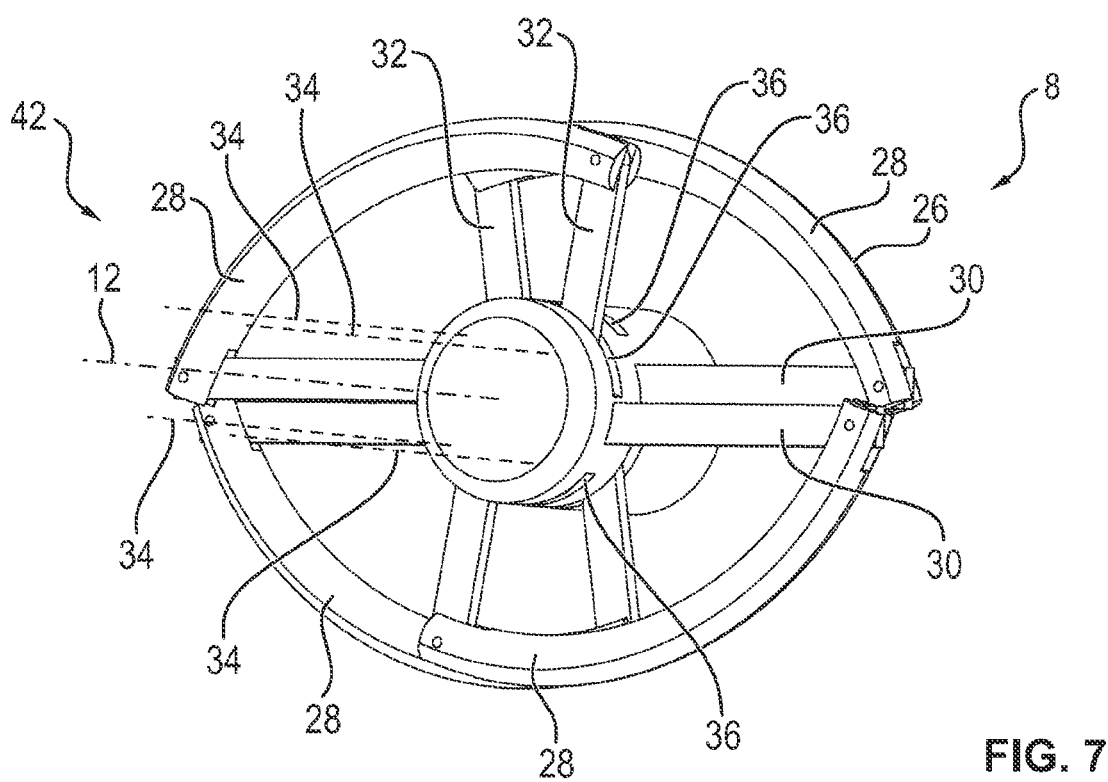

The steering wheel 8 furthermore has a second configuration 42 which is shown in a plan view in FIG. 6 and in a perspective view in FIG. 7. The second spokes 32 herein, by means of the electromotive adjustment device 40, have been rotated about the respective pivot axis 34 in relation to the respective first spoke 30 of the same segment 26 and have moreover been displaced by means of the guides 36. An angle of no longer 90° but now of 100° is thus formed between the first spoke 30 and the second spoke 34 of the same segment 26. The pivot axes 34 have also been displaced, and the pivot axes 34 continue to be spaced apart from the longitudinal axis 12. Those ends of the rim portions 28 that are articulated on the second spokes 32 have thus been moved toward the hub 20, such that the extent of the steering wheel 8 perpendicular to the longitudinal axis 12 has been reduced.

Should the driver himself/herself steer the motor vehicle 2, the steering wheel 8 is located in the first configuration 18 and a rotating movement of the steering wheel 8 is detected by means of the sensor unit 14 and transmitted to the control unit 16. In the case of the motor vehicle 2 being autonomously moved, establishing the steering commands takes place by means of the assistance system 17 and the steering wheel 8 has the second configuration 42 such that an available space for the driver is increased. Alternatively thereto, or in combination therewith, the steering wheel 8 is moved to the second configuration 42 when the motor vehicle 2 is parked, for example when boarding or when deactivating an ignition system.

In order for the steering wheel 8 to be moved from the first configuration 18 to the second configuration 42 and vice versa, a warning signal, for example an acoustic, optical or haptic warning signal, is first emitted. The haptic warning signal is in particular emitted by means of vibrating the rim portions 28 using a vibration unit not illustrated in more detail. It is thus made obvious to the driver of the motor vehicle 2 that a change in terms of the configuration of the steering wheel 8 is taking place. The locking device 38 is subsequently activated by means of the electromotive adjustment device 40, and the locking mechanism of the second spokes 32 is cancelled. The second spokes 32 are subsequently driven by means of the electromotive adjustment device 40, and the second spokes 32 are thus pivoted about the respective pivot axis 34, and the pivot axes 34 of the respective segment 26 are moved by means of the guides 36. When the movement ends, locking of the second spokes 32, by means of the locking device 38, takes place again. Furthermore, the steering wheel 8, by means of an electromotive adjustment device (not illustrated in more detail), is displaced parallel to the longitudinal axis 12. The displacement takes place simultaneously with the adjustment of the second spokes 32, for example, or prior or thereafter. In the second configuration 42 herein, the steering wheel 8 from the driver of the motor vehicle 2 is displaced in the direction of a dashboard (not illustrated in more detail). To this end, the steering column 10 is telescopically collapsed, for example, or is completely moved along the longitudinal axis 12. The movement takes place by means of a thrust chain, for example.

It is in particular possible for the offset rim portions 28 in relation to the hub 20 to be repositioned parallel to the longitudinal axis 12. In the first configuration 18, all of the rim portions 28 herein are moved to a plane perpendicular to the longitudinal axis 12, such that a substantially closed steering wheel rim 24 is formed, this facilitating any operation.

Figure 8:
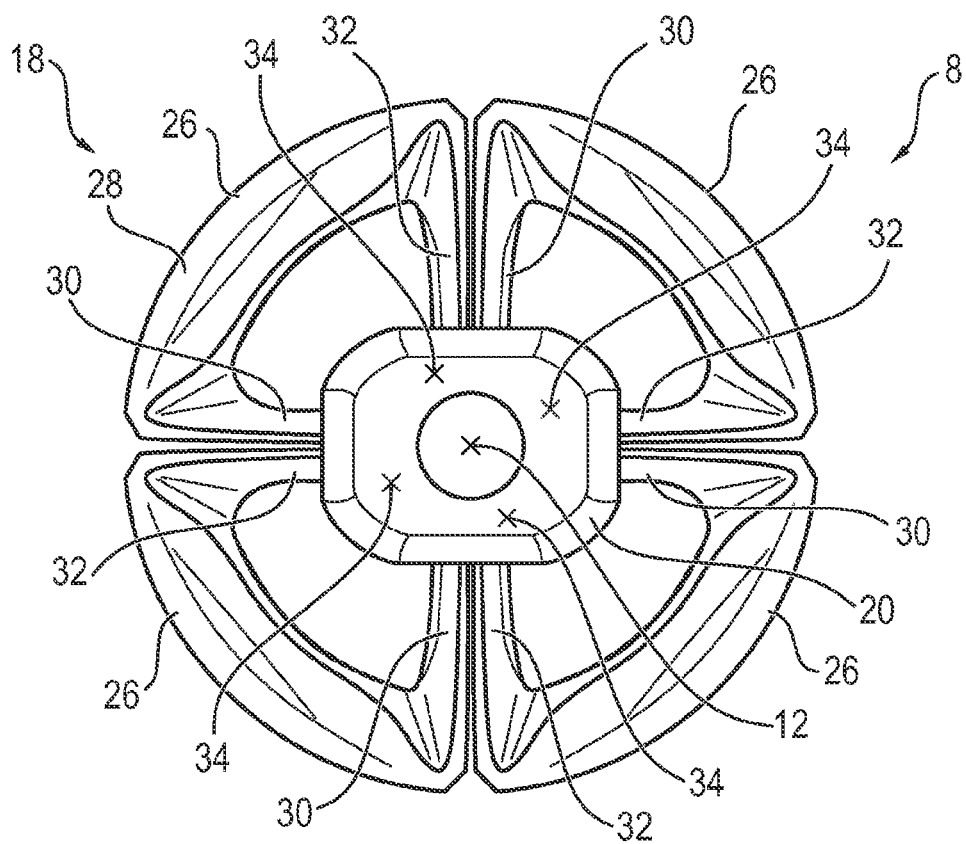
FIG. 8 shows a second design embodiment of the steering wheel in the first configuration in a plan view.
Figure 9:
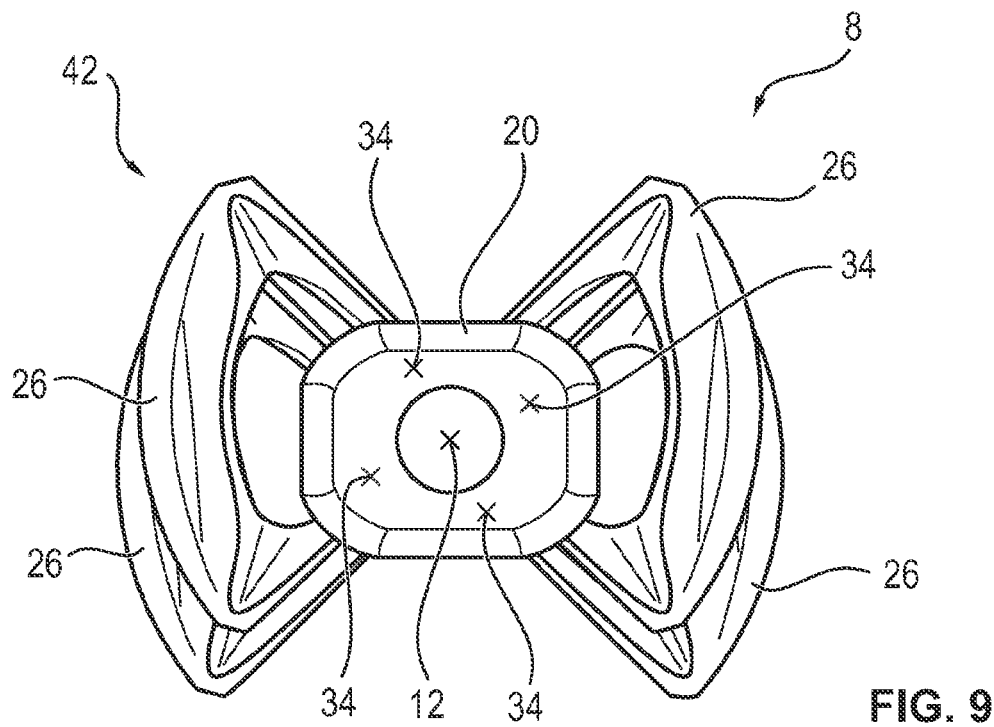
FIGS. 9, 10 show the second design embodiment of the steering wheel in the second configuration, in each case in a plan view.
Figure 10:
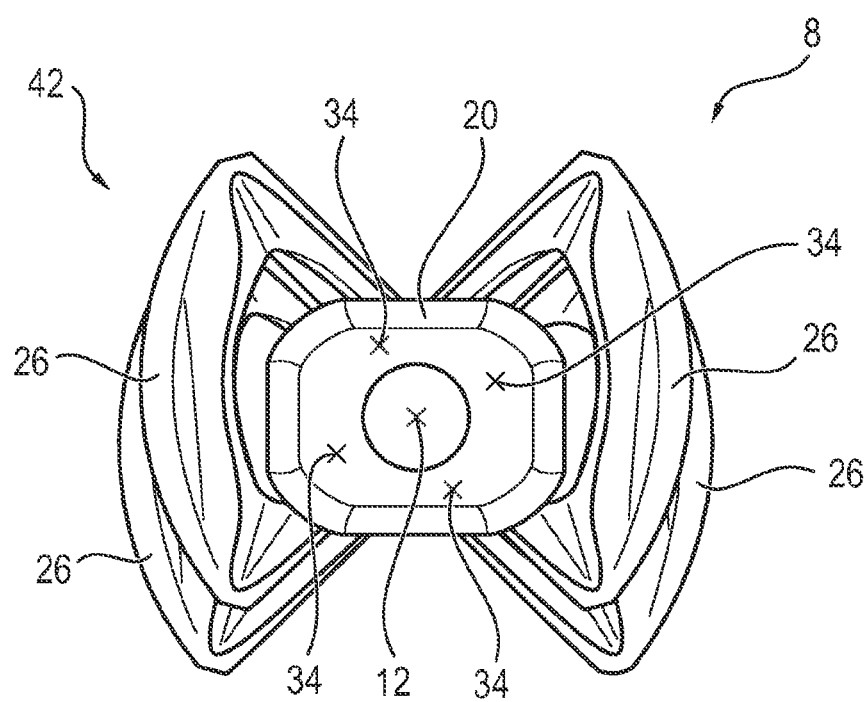

A further design embodiment of the steering wheel 8 is, in each case, illustrated in a plan view in FIGS. 8 to 10, and FIG. 8 shows the first configuration 18, and FIGS. 9 and 10 show, in each case, dissimilar second configurations 42. The hub 20 is again designed so as to be substantially cylindrical, and the base area is designed so as to be rectangular having elongated corners. This embodiment again also has the four seconds 26, and the first spoke 30, the second spoke 32, and the rim portion 28 of each segment 26 are however designed so as to be integral and thus monolithic. The segments 26 are thus, in each case, designed so as to be rigid. The second spokes 32 are again attached so as to be rotatable about the respective pivot axis 34 on the hub 20, and the first spokes 30 are also rotatably attached so as to be rotatable about the same pivot axis 34 of the respective segment 26 on the hub 20. The position of the pivot axes 34 in this embodiment is consistent. In the first configuration 18, the segments 26 are disposed beside one another in the direction that is tangential in relation to the longitudinal axis 12, whereas the segments 26 in the second configuration 42 at least partially overlap in a tangential manner. The rim portions 28 herein, are moved toward the hub 20 by virtue of the pivot axes 34 that are offset in relation to the longitudinal axis 12.

The rim portions 28 in relation to the hub 20 can additionally be repositioned along the pivot axis 34, for example, such that a closed steering wheel rim 24 is formed in the first configuration 18. The mutually offset rim portions 28 are in particular repositioned "toward the front" and form the closed steering wheel rim 24. In order to be transferred to the second configuration 42, two of the four rim portions 28 are then repositioned "backward" along the longitudinal axis 12, such that the rim portions 28 are subsequently offset. The second configuration 42 is then established by means of rotation about the pivot axes 24.

Figure 11:
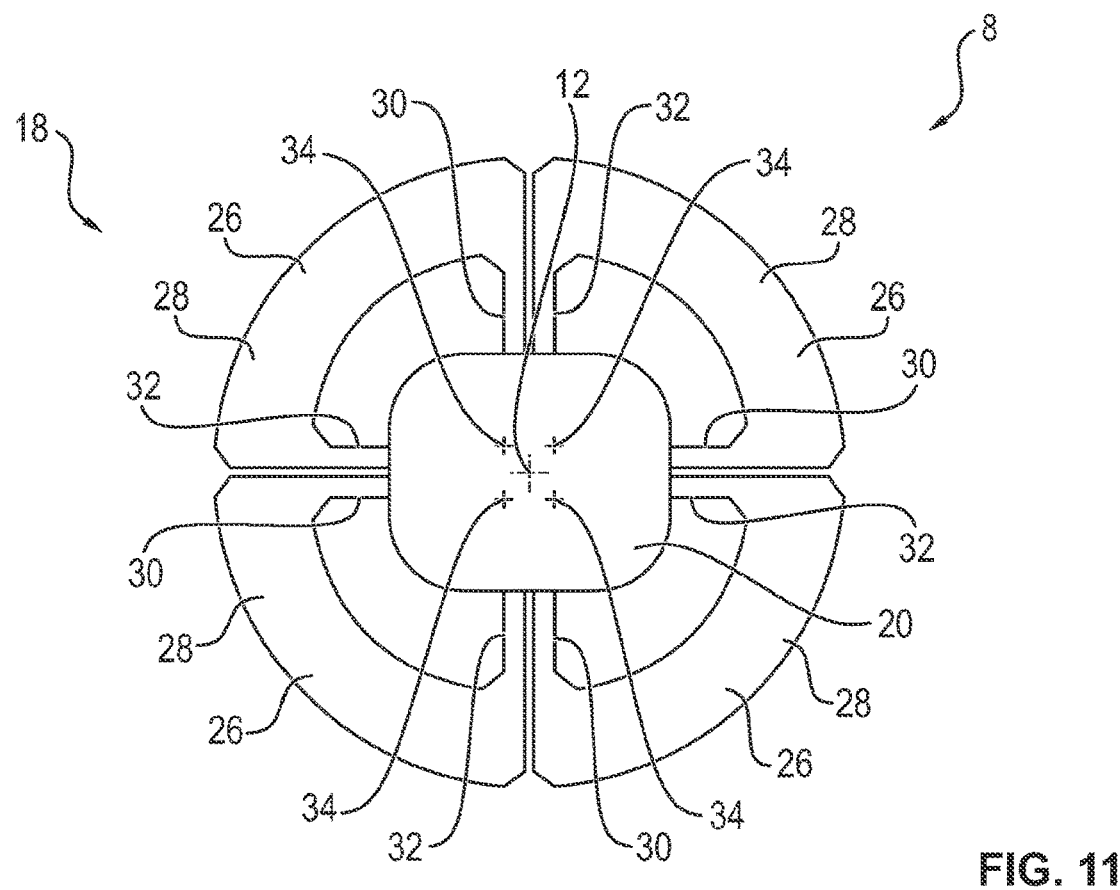
FIG. 11 shows a third design embodiment of the steering wheel in the first configuration in a plan view.
Figure 12:
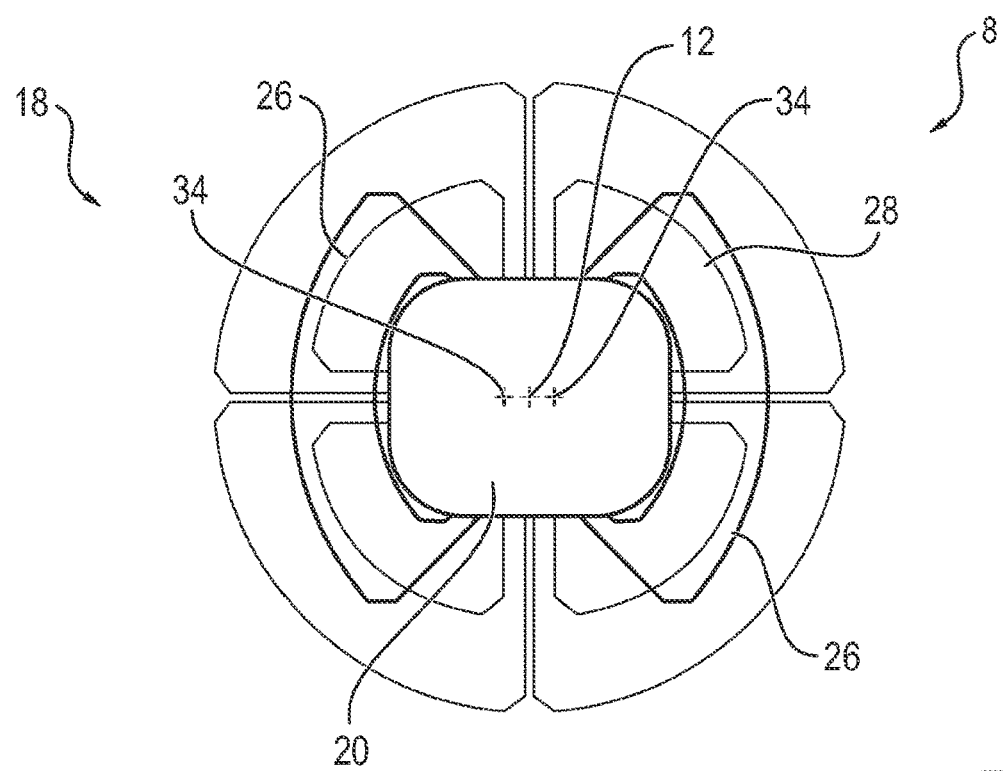
FIG. 12 shows the third configuration of the steering wheel in the second configuration in a plan view.

A further design embodiment of the steering wheel 8 is, in each case, shown in a plan view in FIGS. 11 and 12, and FIG. 11 shows the first configuration 18. The hub 20 in comparison to the preceding embodiment has radiused corners. Here too, the segments 28 are, in each case, designed so as to be rigid and integral, and the first spoke 30 and the second spoke 32 are, in each case, attached so as to be rotatable about the same pivot axis 34 on the hub 20. In order for the steering wheel 8 to be moved to the second configuration, which, in FIG. 12, is shown additionally to the first configuration 18, two of the segments 26 are, in each case, pivoted about the respective pivot axis 34, and the pivot axes 34 are moved in such a manner that the latter are mutually congruent in a plan view. The pivot axes 34 herein are disposed in such a manner that the pivot axes 34 coincide. In other words, the pivot axes 34 of two segments 26 that are adjacent in the first configuration 18 are identical.

Summarizing, the steering wheel rim 24 is thus composed of a plurality of segments 26. In the deployed state, thus in the first configuration 18, the rim portions 28 herein form a round shape and are latched therein, in particular by means of the locking device 38. For example, the locking device 38 is designed in such a manner that the rim portions 28 latch into one another, in each case, at the end sides. The spokes 30, 32 form a folding mechanism which serves for gathering the individual rim portions 28. The second spokes 32, by way of, in each case, one end, are connected to the hub 20 by means of a rotary joint. The first spokes 30 are likewise connected to the hub 20. The rim portions 28 are attracted to the hub 20 or guided away from the latter, respectively, in a rotating movement of the hub 20 in relation to the rim movements 28 and vice versa. The steering wheel 8 herein has at least two rim portions 28 of this type and thus has two segments 26. The retracted state herein is in particular identical to the second configuration 42, in which the steering wheel 8 has a reduced extent. The deployed state corresponds to the first configuration 18, in which the steering wheel 8 has an enlarged extent. In the folded state, thus in the second configuration 42, the hub 20 is framed by segments 26 which are folded together, or folded inward, respectively.

A saving in terms of space is thus provided, and when the steering wheel 8 is not in use, in particular in an autonomous travel of the motor vehicle 2, or when the motor vehicle 2 is parked, it is possible for the steering wheel 8 to be stowed away/folded up, this increasing the level of comfort and improving a visual impact.

It is possible herein for the individual segments 26 to be varied. For example, there are two, three, or four segments 26, and the angle assigned to each rim portion 28 corresponds in particular to the fraction of 360° and the number of segments 26. The segments 26, in particular the second spokes 32, are adjusted by means of the electromotive adjustment device 40. The electric motor of the electromotive adjustment device 40 herein is disposed so as to be coaxial with the longitudinal axis 12, for example, or so as to be transverse to the latter. Moreover, the steering wheel 8 in one embodiment is adjusted parallel to the longitudinal axis, this leading to a further saving in terms of space. Latching elements, which are, in each case, in particular a component part of the locking device 38, are in particular located at the respective end positions, thus in the first configuration 18 and the second configuration 42. The warning signal is in particular emitted, for example in a haptic, acoustic and/or optical manner, when the locking mechanism is released or established.

The invention is not limited to the exemplary embodiments described above. Rather, other variants of the invention can be derived therefrom by a person skilled in the art without departing from the subject matter of the invention. Furthermore, all individual features described in the context of the individual exemplary embodiments can in particular also be combined in another manner without departing from the subject matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Motor vehicle
4 Front road wheel
6 Steering device
8 Steering wheel
10 Steering column
12 Longitudinal axis
14 Sensor unit
16 Control unit
17 Assistance system
18 First configuration
20 Hub
22 Personal protection device
24 Steering wheel rim
26 Segment
28 Rim portion
30 First spoke
32 Second spoke
34 Pivot axis
36 Guide
37 First terminal detent
38 Locking device
40 Electromotive adjustment device
42 Second configuration While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A steering wheel for use in a motor vehicle and configured to rotate about a steering column, the steering wheel comprising:
a hub defining a substantially cylindrical axis arranged parallel to a longitudinal axis defined by the steering column and defining a pivot axis extending parallel to and offset from the longitudinal axis;
a first spoke attached to the hub;
a second spoke; and
a steering wheel rim provided with a segment including a rim portion attached to the first spoke and the second spoke, wherein the second spoke is attached to the hub so that the second spoke is configured to rotate about the hub and pivot about the pivot axis.

2. The steering wheel of claim 1, wherein the first spoke is rigidly attached to the hub.

3. The steering wheel of claim 2, wherein the first spoke is molded to the hub.

4. The steering wheel of claim 2, wherein the first spoke is disposed perpendicular to the longitudinal axis.

5. The steering wheel of claim 1, wherein the hub defines a first terminal detent configured to engage the second spoke when the second spoke rotates from a first position to a second position.

6. The steering wheel of claim 1, further comprising:
a locking device configured to lock the second spoke with respect to the hub.

7. The steering wheel of claim 1, further comprising:
an electromotive adjustment device configured to rotate the second spoke.

8. The steering wheel of claim 1, wherein the rim portion has an arcuate shape, a first end, attached to the first spoke, and a second end, attached to the second spoke, wherein the first end is opposite the second end.

9. The steering wheel of claim 1, wherein the steering wheel rim includes a second segment parallel to the first spoke.

10. The steering wheel of claim 1, further comprising:
a personal protection device disposed in the hub.

11. The steering wheel of claim 1, wherein the rim portion is mounted with respect to the hub so that the rim portion displaceable along a direction parallel to the longitudinal axis.

12. A steering device for use in a motor vehicle, the steering device comprising:
a steering column defining a longitudinal axis and a pivot axis parallel to and offset from the longitudinal axis;
a hub coupled to the steering column and configured to rotate about the longitudinal axis;
a first spoke attached to the hub;
a second spoke; and
a steering wheel rim provided with a segment including a rim portion attached to the first spoke and the second spoke, wherein the second spoke is attached to and rotatable about the hub and configured to pivot about the pivot axis.

13. A steering wheel for use in a motor vehicle and configured to rotate about a steering column, the steering wheel comprising:
a hub configured to be coupled the steering column and rotate with respect to a longitudinal axis defined by the steering column;
a first segment including,
a first rim portion having an arcuate shape,
a first spoke, and
a second spoke, wherein the first spoke the second spoke each extend between the hub and the first rim portion; and
a second segment including,
a second rim portion having an arcuate shape,
a third spoke, and
a fourth spoke, wherein the third spoke the fourth spoke each extend between the hub and the second rim portion,
wherein the first segment and the second segment are configured to collectively move between a use position and a stowage position, in the use position the first rim portion and the second rim portion are disposed in a common plane and in the stowage position the first rim portion and the second rim portion are spaced apart from one another with respect to and along the longitudinal axis.

14. The steering wheel of claim 13, wherein the first spoke and the third spoke are each configured to pivot about a pivot point defined by the hub towards the longitudinal axis.

15. The steering wheel of claim 13, wherein an end of the first rim portion engages an end of the second rim portion when the first segment and the second segment are each in the use position.

16. The steering wheel of claim 13, wherein the first spoke and the second spoke are each configured to rotate about the hub.

17. The steering wheel of claim 16, wherein the third spoke and the fourth spoke are each configured to rotate about the hub.

18. The steering wheel of claim 17, wherein as the first segment and the second segment move from the use position to the stowage position, the second spoke rotates in a first rotational direction and the third spoke rotates in a second rotational direction, wherein the second rotational direction is opposite the first rotational direction.

19. The steering wheel of claim 16, wherein as the first segment and the second segment move from the use position to the stowage position, the first spoke overlaps the second spoke.

20. The steering wheel of claim 13, wherein the hub defines a first guide and a second guide each circumferentially extending along at least a portion of the hub, wherein the first guide and the second guide are spaced apart from one another with respect to the longitudinal axis, wherein the first spoke and the second spoke each extend from the first guide and the third spoke and the fourth spoke each extend from the second guide.

* * * * *